E. W. BLISS.
STEERING MECHANISM FOR VEHICLES.
APPLICATION FILED MAY 5, 1909.

1,026,146.

Patented May 14, 1912.
2 SHEETS—SHEET 1.

Witnesses
Nelson Copp.
H. I. Simms

Inventor
Edward W. Bliss
By Church & Rich
his Attorneys

E. W. BLISS.
STEERING MECHANISM FOR VEHICLES.
APPLICATION FILED MAY 5, 1909.
1,026,146.
Patented May 14, 1912.
2 SHEETS—SHEET 2.
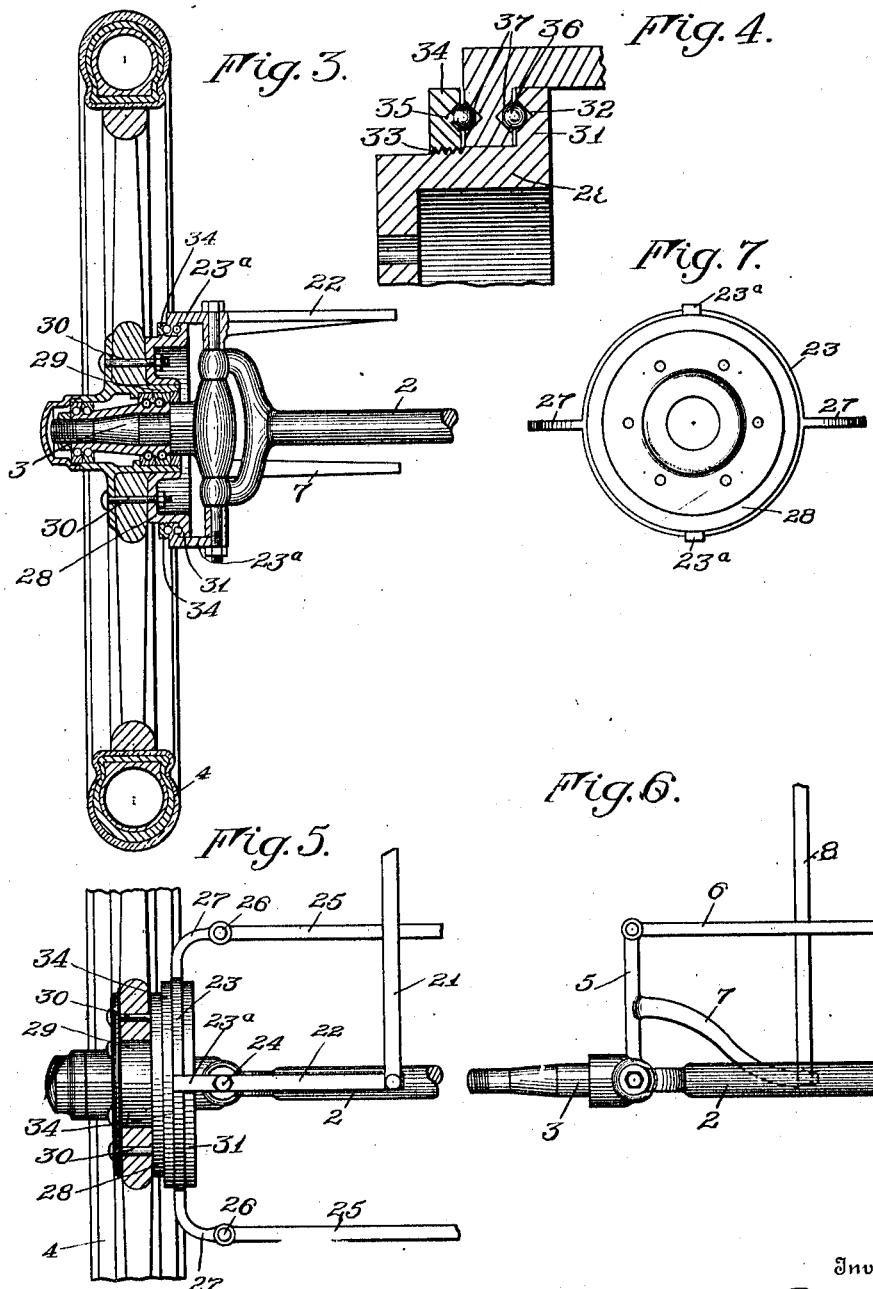

UNITED STATES PATENT OFFICE.

EDWARD W. BLISS, OF ROCHESTER, NEW YORK.

STEERING MECHANISM FOR VEHICLES.

1,026,146.

Specification of Letters Patent. Patented May 14, 1912.

Application filed May 5, 1909. Serial No. 493,996.

*To all whom it may concern:*

Be it known that I, EDWARD W. BLISS, of Rochester, in the county of Monroe and State of New York, have invented certain new and useful Improvements in Steering Mechanism for Vehicles; and I do hereby declare the following to be a full, clear, and exact description of the same, reference being had to the accompanying drawings, forming a part of this specification, and to the reference-numerals marked thereon.

The present invention relates to vehicles and more particularly to the steering thereof, and it has for an object to make provision which will give greater security to the users of motor vehicles, such as automobiles, boats and air ships.

To this and other ends the invention consists in certain improvements and combinations of parts all as will be hereinafter more fully described, the novel features being pointed out in the claims at the end of the specification.

Figure 1:
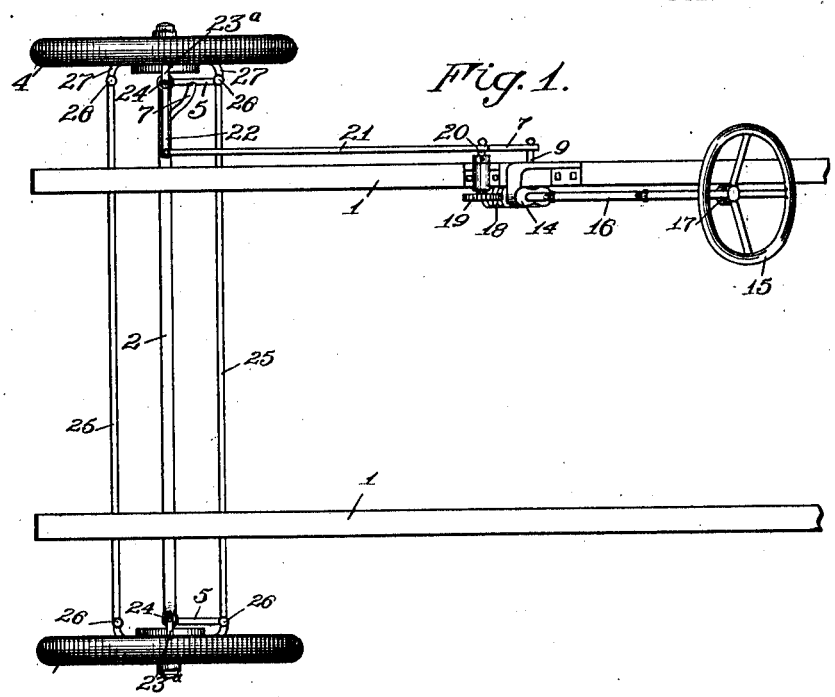
Figure 2:
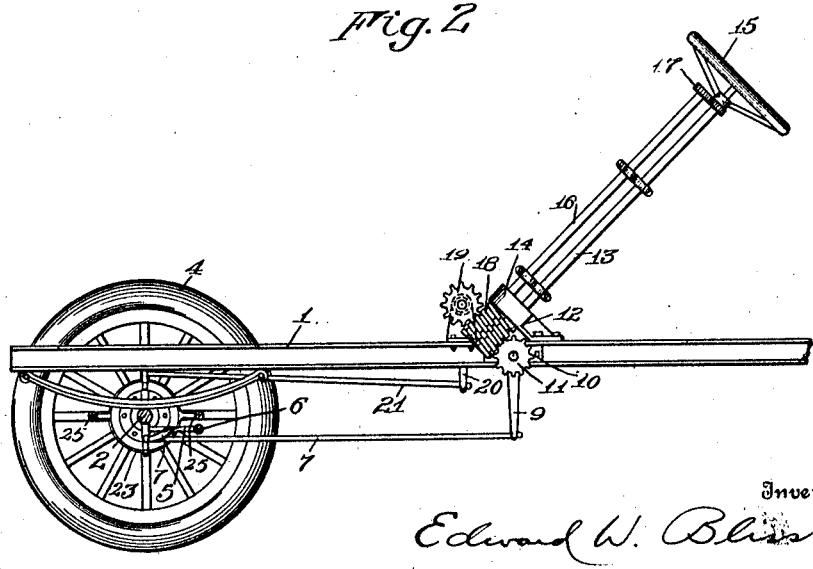

In the drawings: Figure 1 is a top view of a portion of an automobile with the present improvements attached thereto; Fig. 2 is a central vertical section of the parts illustrated in Fig. 1; Fig. 3 is a vertical section through one of the vehicle wheels showing in section those portions of the invention attached to and arranged in proximity to the wheel; Fig. 4 is an enlarged detail section showing the manner of connecting the steering mechanism to a vehicle wheel; Fig. 5 is a view showing a portion of the wheel in section and the supplemental steering mechanism in plan, the main steering mechanism being removed in order to afford better illustration; Fig. 6 is a detail plan view of the main steering mechanism, and Fig. 7 is a detail view of the bearing member which is secured to the wheel for the purpose of effecting connection of the supplemental steering mechanism to the wheel.

In the present embodiment the invention is applied to an automobile of which only parts are illustrated, 1 indicating the side pieces of the frame of the vehicle and 2 the front axle which may carry, as usual, spindles 3 swinging about vertical axes and having turning thereon wheels 4 of any suitable construction. The steering of the vehicle is effected by a main steering mechanism preferably embodying arms 5 rigid with and extending rearwardly from the spindles 3 and connected by a rod 6 for simultaneous movement. Also connected to one of the arms 5 is an arm 7 to which a pull rod or bar 8 is pivotally secured, the latter being operatively connected to a swinging arm 9 mounted on the frame at 10 and having a worm wheel 11 connected thereto. The worm wheel 11 meshes with a worm 12 which is rigidly secured to an operating shaft 13 supported in any suitable manner, as by bracket 14, and having the operating or controlling member or steering wheel 15 secured at its upper end.

Combined with the main steering mechanism is a supplemental steering mechanism which preferably is operable from the controlling member of the main steering mechanism so as to be operated simultaneously with the latter and has direct connection with the vehicle wheels. This mechanism may comprise a shaft 16 lying parallel with shaft 13 and geared to the latter by gearing 17. On the lower end of the shaft 16 is arranged a worm 18 which meshes with the worm wheel 19 supported on the vehicle frame and operatively connected to the swinging arm 20 which in turn connects with a pull bar or rod 21 that extends forwardly and is pivoted to an arm 22 on a member 23. The member 23 is preferably in the form of a ring mounted to swing about an axis coincident with the turning axis of the spindle 3, the ring having arms 23ª extending therefrom and turning on a pivot pin 24 which also serves for securing one of the pivoted spindles 3 to axle 2. The member is duplicated upon the opposite side of the machine and both members are connected for simultaneous movement preferably by rods 25 which are pivoted at 26 to arms 27 extended inwardly from the opposite sides of the ring members. To permit these ring members to connect directly to the wheels there is arranged on each wheel an annular bearing member for coöperation with the ring members 23 which bearing member preferably embodies an annulus 28 fitting the inner end of the hub 29 as a substitute for a hub plate and being secured in position to the hub by bolts 30. At its inner end, the annulus carries a fixed flange 31 provided on one face with a ball raceway 32 while the periphery of the annulus is screw threaded externally at 33 to receive a retaining ring 34 formed with a ball raceway 35. Between the flanges 31 and the retaining ring 34, the ring member 23 operates, balls 36 traveling in the raceways 32 and 35 and in coöperating raceways 37 formed on opposite sides of the ring member and serving to reduce the friction between the ring member 23 and the bearing member on the wheel.

In operation, the controller or steering wheel 15 is rotated to steer the vehicle. This effects the rotation of the shafts 13 and 16 causing both the main and the supplemental steering mechanism to be simultaneously operated, the rod 8 shifting the spindle 3 and the rod 21 shifting the ring member 23.

It is apparent that with this invention the users of motor vehicles will be doubly insured against loss of control over the vehicles for it is practically impossible for both of the steering mechanisms to break simultaneously, and if either one of them becomes broken the other will serve for steering the vehicle.

I claim as my invention:

1. In a vehicle, the combination with a main steering mechanism embodying an upright shaft having a manually controlled member secured to the upper end thereof, of a supplemental steering mechanism having operative connection with the vehicle independently of the main steering mechanism and embodying a shaft parallel with the first named shaft and geared to the latter to be operated thereby.

2. The combination with a vehicle having swingingly mounted spindles and wheels turning thereon, of a main steering mechanism embodying an upright shaft having a manually controlled member secured to the upper end thereof, of a supplemental steering mechanism embodying a shaft parallel with the first named shaft and geared to the latter to be operated thereby, said supplemental steering mechanism having operative connection with the vehicle independently of the main steering mechanism comprising devices coöperating with the wheels and pivots for said devices supported independently of the wheels and arranged coincident with the swinging axes of the spindles.

EDWARD W. BLISS.

Witnesses:
RUSSELL B. GRIFFITH,
HAROLD H. SIMMS.